United States Patent [19]

Malcolm

[11] Patent Number: 5,701,463
[45] Date of Patent: Dec. 23, 1997

[54] METHOD OF REPLACING THE IDENTITY OF A FILE WITH ANOTHER AS PART OF A FILE OPEN REQUEST IN A COMPUTER SYSTEM

[75] Inventor: Peter Bryan Malcolm, Lewdown, United Kingdom

[73] Assignee: Cheyenne Advanced Technology Limited, London, England

[21] Appl. No.: 304,098

[22] Filed: Sep. 9, 1994

[51] Int. Cl.[6] .............................................. G06F 13/00
[52] U.S. Cl. .................... 395/610; 395/712; 395/619; 395/200.05; 395/187.01
[58] Field of Search .................. 395/425, 575, 395/600, 700, 725, 800, 650, 186, 619, 610, 712; 380/4

[56] References Cited

U.S. PATENT DOCUMENTS

| | | | |
|---|---|---|---|
| 4,757,533 | 7/1988 | Allen et al. | 380/25 |
| 4,780,821 | 10/1988 | Crossley | 395/610 |
| 5,008,820 | 4/1991 | Christopher, Jr. et al. | 395/610 |
| 5,109,515 | 4/1992 | Laggis et al. | 395/725 |
| 5,155,827 | 10/1992 | Ghering | 395/425 |
| 5,257,381 | 10/1993 | Cook | 395/700 |
| 5,261,051 | 11/1993 | Masden et al. | 395/200 |
| 5,313,646 | 5/1994 | Hendricks et al. | 395/600 |
| 5,327,563 | 7/1994 | Singh | 395/700 |
| 5,388,257 | 2/1995 | Bauer | 395/600 |
| 5,390,297 | 2/1995 | Barber et al. | 395/712 |

FOREIGN PATENT DOCUMENTS 0 254 854  2/1988  European Pat. Off. .

Primary Examiner—Thomas G. Black
Assistant Examiner—Hosain T. Alam
Attorney, Agent, or Firm—Fish & Richardson P.C.

[57] ABSTRACT

In an improved method for accessing files in a computer system, file open requests are intercepted at the level of the operating system. The identity of the file to be opened is extracted from the request and a determination is made as to whether the identity of the requested file should be replaced with the identity of a substitute file to be opened instead of the requested file. If it is determined that the identity should be so replaced, the file open request is amended by substituting the identity of the substitute file for the identity of the requested file, and the request is passed on to its original destination for execution. This technique can be used to cause execution of a substitute program without the knowledge of the user. As an example, software metering can be implemented in a network system by substituting a different program from that requested when the number of copies of the requested program in use on the network has reached the maximum licensed number, so as to provide a user-friendly rejection of the program execution request.

14 Claims, 3 Drawing Sheets

METHOD OF REPLACING THE IDENTITY OF A FILE WITH ANOTHER AS PART OF A FILE OPEN REQUEST IN A COMPUTER SYSTEM

BACKGROUND OF THE INVENTION

This invention relates to a method of accessing files at the operating system level of a computer system. The invention is primarily useful for controlling access to executable files in a networked system, but also has other uses.

In a computer system, it is sometimes required to modify the operation of the system in a manner which is transparent to both a user and to the operating system of the computer system.

One typical situation where this requirement arises results from the trend towards storing application software on a network file server rather than on a standalone personal computer. A network system manager then needs only to install a single copy of an application on the file server which can be accessed from any machine or workstation on the network. This approach provides improved flexibility, for example, when altering the setup of an application or when updating the application, and reduces the total installation time for a particular application since only one installation is required (which may take an hour or more) for each file server rather than each workstation.

The above approach raises a problem in connection with the licensing of the application. Virtually all applications are licensed under an agreement which permits use either on a single machine or on a predetermined, fixed, maximum number of machines.

There is usually little or no technical limitation on the number of users who can simultaneously use a particular application installed on a network file server. Therefore, to stay within the terms of a multi-user licence agreement, it is necessary to implement some form of software metering which operates to restrict the number of simultaneous users of an application to within the predetermined maximum number specified in the licence.

Conventionally, software metering operates by intercepting requests to execute a particular application and by checking how many users are already using the application. If the maximum number of users has already been reached further requests to execute the application are refused. If the maximum number has not been reached, a 'copies in use' count is incremented and the request permitted to operate as normal. Upon termination of the metered application, the termination is also detected and the 'copies in use' count decremented.

Such metering control is provided in one of three ways. Firstly, using a utility program resident in each workstation on a network which intercepts requests to execute networked programs and allows execution depending on a 'copies in use' count held in a shared server file. Secondly, by renaming the startup file of the networked program so that a 'stub' program is executed instead of the networked program. When executed, the stub checks a 'copies in use' count stored in a shared server file and executes the networked program as a child process if the maximum number of users would not be exceeded by executing the networked program. Thirdly, using a utility program resident on a file server which intercepts requests to access a networked program and permits execution based on a local 'copies in use' counter. If the maximum number of users has already been reached then the utility program returns an error code to the workstation.

Each of the above methods have disadvantages. The first is not secure since it can be overcome by unloading or otherwise disabling the resident workstation utility program. The first and second methods both use valuable workstation memory which reduces the memory space available in the workstation (for all applications in the case of the first method, and for each metered network program in the case of the second method). The third method usually results in an unfriendly and possibly fatal error message from the workstation operating system when execution is refused by the file server.

It is an object of the invention to provide an improved method of accessing files.

SUMMARY OF THE INVENTION

According to one aspect of the invention, there is provided a method of operating a computer system having memory means, a central processor for executing an operating system, and a storage means for storing a file, in which the operating system periodically executes a request to open the file stored in the storage means, wherein the method includes intercepting at the level of the operating system a file open request identifying a first file to be opened. The method further includes extracting from the file open request the identity of the first file, and then determining whether the identity of the first file should be replaced with the identity of a substitute file to be opened instead of the first file and, if it is determined that the identity should be so replaced, amending the request to replace the identity of the first with the identity of the substitute file. The file open request is then passed on for execution either amended or not amended according to the result of the determination.

The method can be arranged to be transparent both to the operating system and to the user. It is particularly applicable to intercepting user file open requests whether the request originates from a work station in a computer network or from a stand-alone machine. In the case of the computer system being a computer network comprising a file server and at least one workstation, the method may include the steps of maintaining a record of the number of copies of the first file in use on the network, and determining whether the identity of the first file should be replaced by the identity of the substitute file by checking whether the record indicates that a predetermined number of copies of the file in use would be exceeded by executing the file open request. In this way, software metering can be implemented entirely at the file server and without using any additional workstation memory. It is possible then to provide rejection of network program execution requests in a user-friendly manner or, if the relevant number of copies would not be exceeded, to provide acceptance of the requests transparently to the user.

The method may include selecting the substitute file from a plurality of potential substitute files, according to the identity of the first file. Such selection may include determining whether the first file is an executable file or not, and may extend to determining the executable type of an executable first file so that the substitute file is chosen according to the determined executable type. Determination of executable file type may be performed by comparing at least part of the name of the first file with a predetermined list of filenames.

In an apparatus aspect, the invention comprises a computer system having memory means, a central processor for executing an operating system, and storage means for storing a file, the operating system being arranged to execute periodically requests to open the file stored in the storage means, the system further including means for intercepting at the operating system level a file open request identifying a first file to be opened. The system further includes means for extracting from the request the identity of the first file, and means for determining whether the identity of the first file should be replaced with the identity of a substitute file to be opened and, if it is determined that the identity should be so replaced, amending the request to replace the identity of the first file therein with the identity of the substitute file. Means are also provided for passing the request on to its original destination for execution.

DESCRIPTION OF THE PREFERRED EMBODIMENT OF THE INVENTION

Figure 1:
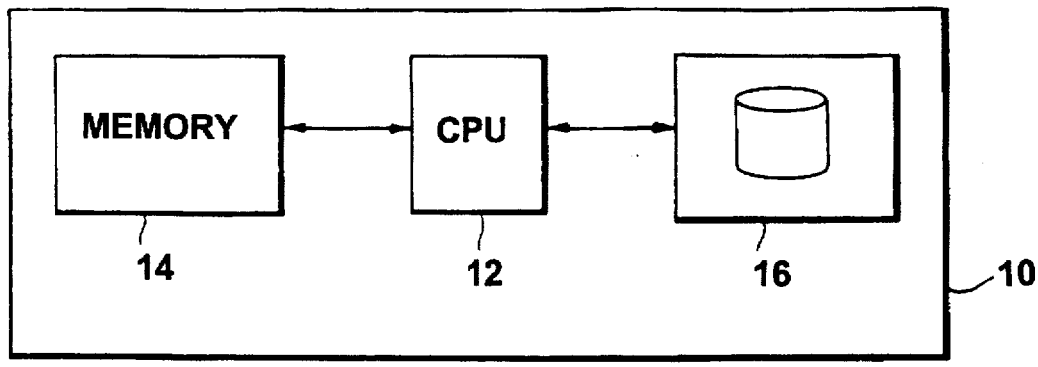
FIG. 1 is a block diagram illustrating a typical computer system.

With reference to FIG. 1, the invention is implemented on a computer system 10 comprising a central processing unit (CPU) 12, a memory device 14 and a storage device 16 (depicted in this case as a disk drive).

The computer system 10 executes an operating system. In the embodiment to be described below, this is the DOS operating system as used on IBM-compatible personal computers, but the method of the invention is applicable with a variety of operating systems.

Figure 2A:
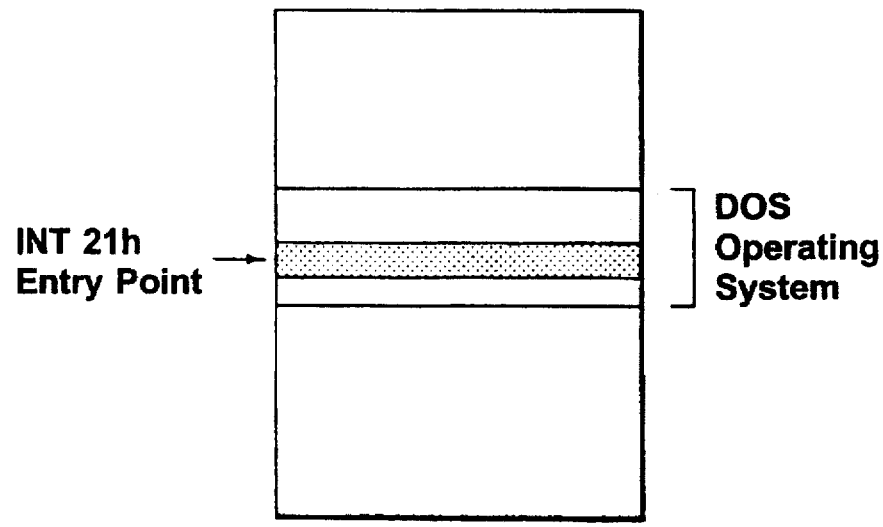
FIGS. 2A and 2B are diagrams illustrating a system memory map at the operating system level of the computer system, and a system modified to operate in accordance with the invention respectively.

Referring to FIG. 2A, in all operating systems, prior to using a file stored on the storage device 16, a call is made to the operating system (in this case via interrupt 21h) which requests that a file named in the call, be opened. When opening a file, the operating system takes the name of the file passed to it and allocates it a file "handle" (usually just a number) which is passed back to the process requesting the file to be opened. The handle uniquely identifies the open file. When the file is first opened, the operating system performs various functions such as locating the file on the storage device 16. By using a file handle to subsequently identify the file, the time taken to perform these functions is avoided since the details can be stored in a table which relates details of the file with its handle. When the file is no longer required by the process, the file is closed which causes the table entry relating to that handle to be deleted.

Figure 2B:
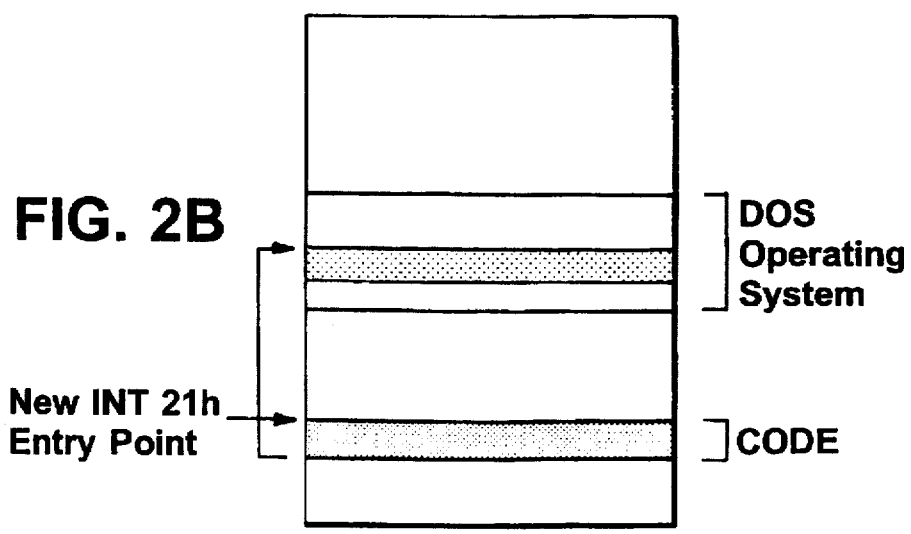
Figure 3:
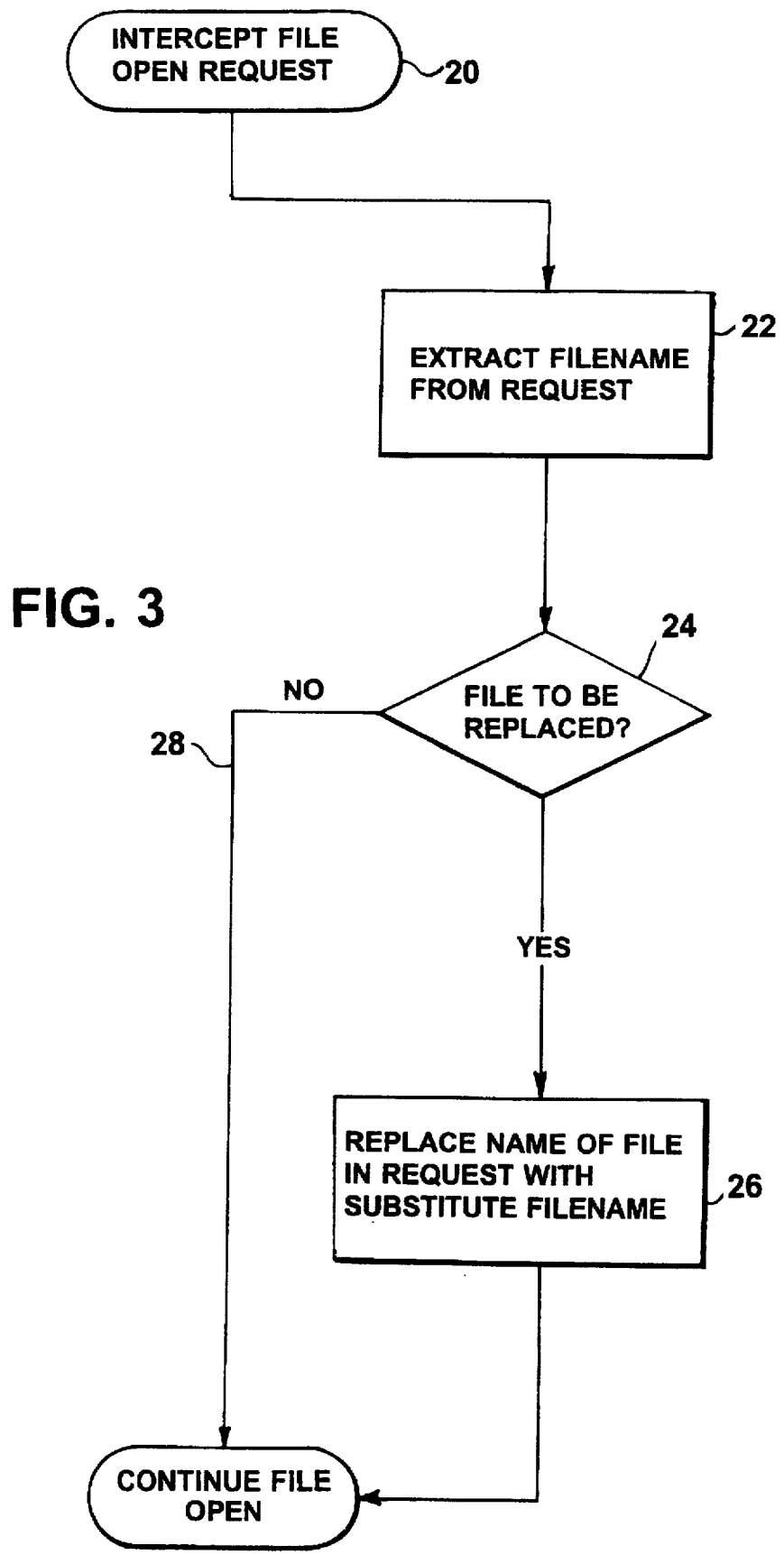
FIG. 3 is a flow chart illustrating the principle of the invention.

With reference to FIG. 2B which reflects the situation in an MS-DOS environment, by re-vectoring the interrupt 21h entry point to a new portion of code, each file open request may be intercepted. Subsequently, a jump is made to the piece of code intended to be executed when this interrupt occurs (as shown by the arrows on the left side of the Figure). The basic steps in the new portion of code are shown in FIG. 3. Firstly, a check is performed to determine whether the interrupt occurred due to a file open request. If not, a jump is immediately made to the usual portion of code. If a file open request has been intercepted (step 20), the name of the file to be opened is extracted (step 22) by reading the string pointed to by the CPU register pair DS:DX. This string contains the name of the file to be opened. Next, it is determined whether the file needs to be replaced (step 24). This depends mainly upon the use to which the method is being put and several examples of uses are given below.

If the file is to be replaced, the name in the file open request is replaced with that of a substitute file by amending the DS:DX register pair to point to a string containing the name of the substitute file. The usual portion of code is then made to execute (step 26). However, if it is determined that no substitution is required, a jump is made directly to the usual portion of code without any filename substitution (step 28).

The substitution occurs transparently to both the requesting process and the operating system. The requesting process simply receives a file handle which it expects to relate to the file which it requested to be opened, although it actually relates to the substitute file. Conversely, the operating system cannot determine that the name of the file to be opened has been changed since the process made the request and simply receives what appears to be an ordinary file open request.

Preferably, if the original file is an executable file the substitute file is an executable file of the same type. This can be important since the process that requested the executable file to be opened is likely subsequently to cause the file to be executed. If the substitute file is not an executable file or is an executable file of a different type (for example for a different type of machine) then unpredictable results will occur if the substitute file is executed.

The executable file type of the original file may for example, be determined by assuming that at least in an MS-DOS compatible environment, only five types of executable program exist, namely, DOS COM, DOS EXE, Windows EXE, OS/2 EXE and Windows NT EXE.

The "COM" program may be identified at least by having the filename extension ".COM". The remaining executable program files all have the filename extension ".EXE" but also have a file header which uniquely identifies which type of EXE file it is. All the EXE files except DOS EXE files have a segmented executable header which contains known bytes which identify the type of executable file. The DOS EXE file may be identified by having a ".EXE" extension and by not having a segmented executable header.

Thus the executable file type may be determined using a combination of filename extension, file header and segmented executable header information.

Operating systems must always open an executable file to read the contents into the memory and generally determine the size of the executable code from the file itself. Thus, the substitute program does not need to be the same size as the originally requested program though it should not require more memory than the original program would have required if it is to be certain of executing.

Figure 4:
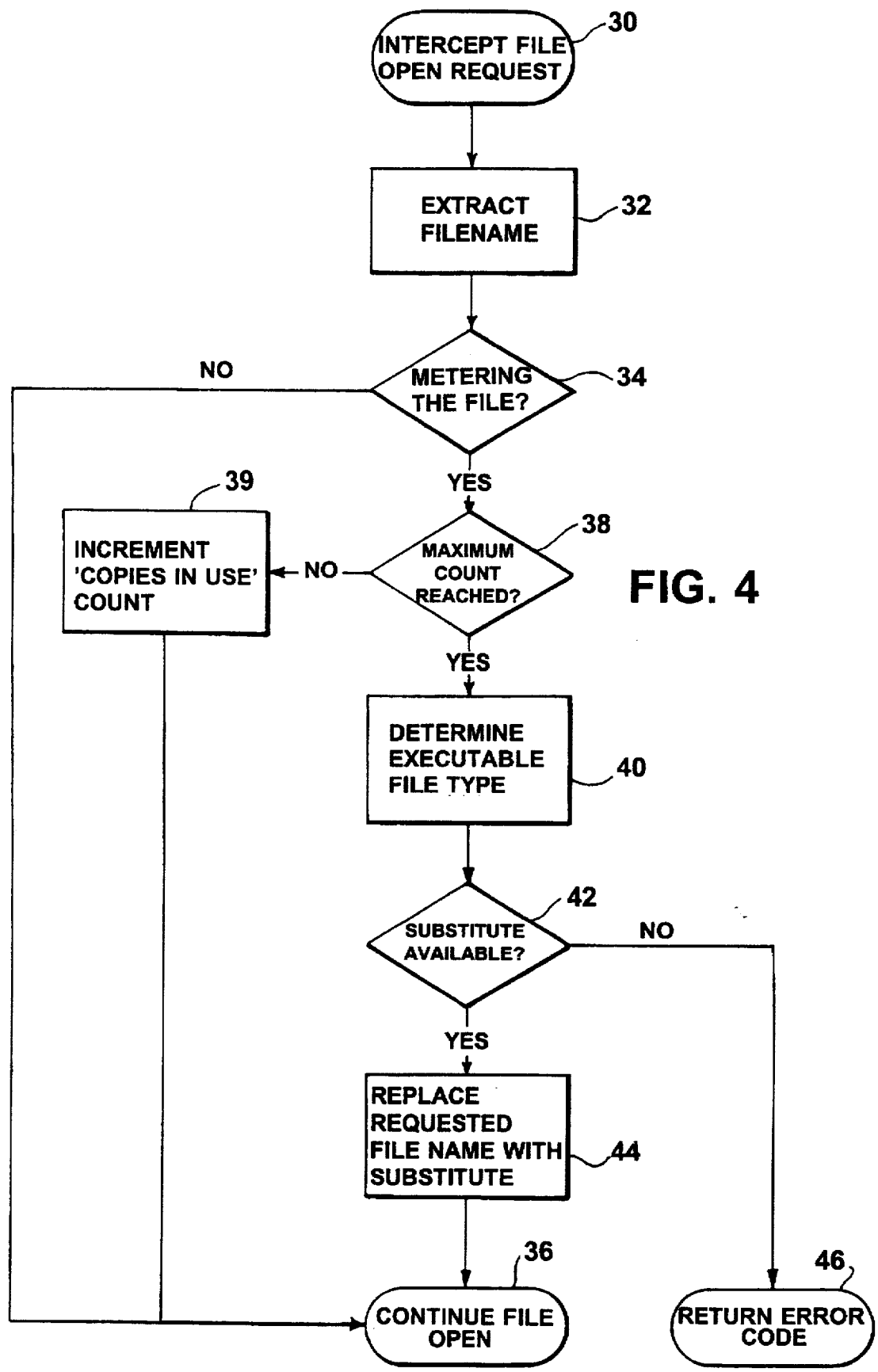
FIG. 4 is a flow chart illustrating a software metering technique in accordance with the invention.

A preferred embodiment of the invention implements software metering, as illustrated in FIG. 4.

Control over whether to permit execution of a file is implemented at the file server by a controlling utility. Referring to the flowchart of FIG. 4, a workstation request to open a file is intercepted (step 30) at the file server and the name of the file to be opened is extracted (step 32). The extracted name is compared with a list of filenames to check if the file is one which is metered (step 34). If the file is not metered, the file open request is operated on in the normal way (step 36). If the file is metered, the 'copies in use' count is checked to see if the maximum number of copies is already in use (step 38). If the maximum number of copies is not already in use, the count is incremented (step 39) and the file open request is operated on in the normal way (step 36).

If the maximum count has already been reached then it is necessary to reject the workstation request to execute the program. Firstly (in step 40), the type of executable file is determined (in a standard MS-DOS environment this might be a determination between a Windows and a DOS program for example). Having determined the type of executable file, an attempt is made to find a suitable substitute (step 42). If a substitute is available, the filename in the open request is replaced with the name of the substitute (step 44) and the open request is operated on in the normal way (step 36). If a substitute is not available, an error code is returned to the workstation (step 46).

In more detail, if execution is to be refused, the controlling utility firstly determines the type of executable file which is being accessed, either using a previously defined table or dynamically using a combination of the name of the file, extension, directory attributes and/or file header. In practice, most types of executable programs encountered on LAN file servers can be determined using this method including those from DOS, Windows, Windows NT, OS/2 and Macintosh operating systems.

Having identified the file type, the controlling utility replaces the filename in the open file request with that of a substitute program of the same executable type and then allows the request to proceed.

Having substituted a different file for the one which the workstation is expecting to execute, the workstation will execute the substitute program when it comes to execute the opened file. Neither the workstation nor the operating system will detect any change. The substitute program can be used to display a suitable message on the workstation informing the user that the application is currently in use by the maximum number of users and that execution has therefore been refused. The program may also present the option of manually or automatically re-trying to execute the application.

Since the substitute program can generally determine its own name and location from the operating system (i.e. the name which was originally used in the file open request), it can both display the name of the requested application and retry executing the application by chaining, i.e. by terminating itself and causing another named program (the original application) to begin executing. If the application is now available, execution will begin. If it is not available, the substitute program will be run again.

It is not necessary to provide a substitute program for every possible executable file type since, in the worst case, the file open request can be rejected with an error code if no substitute program is available or if the executable file type cannot be determined.

Another embodiment of the invention permits a network system manager to send a message to any user using a particular application by substituting the application with a program which generates the message and then chains to the application. This is an improvement over conventional message utilities which are restricted to addressing a particular group of named users rather than specifically to a user executing an application.

Using the method of the invention, a message is only sent when the particular application is executed. A typical message might be :—"Please note that spreadsheet sales files have been moved to directory x". In this way, the message is seen only by interested users and only at the time that the message is relevant.

A further embodiment of the invention concerns the operation whereby a network user logs in to the network, and can be used to perform an operation either visibly or secretly in relation to the user and/or the operating system as follows. The login program is usually stored on the file server and may be substituted in a similar manner to that set out above in connection with the metering application. The substitute program can be designed automatically to update software on the workstation such as network driver programs and can then chain the original login program. In this way, a system manager can update workstation files without having personally to visit each workstation or rely on the user to carry out the operation. Since the control utility can determine the physical workstation address, different operations can be carried out for different workstations.

I claim:

1. A method of operating a computer system having, at a first computer site, memory means, a central processor for executing an operating system, and storage means for storing a file, in which the operating system at the first computer site periodically executes requests from a second computer site to open the file stored in the storage means, wherein the method comprising the steps of:

intercepting, at the first computer site, a file open request made from the second computer site to the operating system identifying by at least a name a first file to be opened;

extracting from the request the name of the first file;

determining whether the extracted name of the first file should be replaced with the name of a substitute file to be opened instead of the first file and, if it is determined that the name should be so replaced, amending the request, before passing the request to the operating system, to replace the name of the first file with the name of the substitute file, and passing the request to the operating system to open the first file if it is determined that the name of the first file should not be replaced, or to open the substitute file at the first computer site if it is determined that the name of the first file should be replaced.

2. A method as claimed in claim 1, wherein the request originates from a user and the method is transparent both to the operating system and to the user.

3. A method as claimed in claim 1, wherein the substitute file is selected from a plurality of files, according to the name of the first file.

4. A method as claimed in claim 1, including the step of determining whether the first file is an executable file.

5. A method as claimed in claim 4, wherein the substitute file is chosen to be of the same executable type as the first file.

6. A method as claimed in claim 5, wherein at least part of the name of the first file is compared with a predetermined list of filenames to determine executable file type of the first file.

7. A method as claimed in claim 5, wherein the executable file type of the first file is determined without using a predetermined list of filenames.

8. A method as claimed in claim 7 wherein the executable file type is determined using the file header of the first file.

9. A method as claimed in claim 1, wherein the computer system is a computer network comprising a file server and at least one workstation, the method further including the step of:

maintaining a record of the number of copies of the first file in use on the network, and wherein the step of determining whether the name of the first file should be replaced with the name of the substitute file comprises checking whether the record indicates that a predetermined number of copies would be exceeded by executing the file open request.

10. A method as claimed in claim 9, wherein the method steps are performed solely by the file server.

11. A computer system having, at a first computer site, memory means, a central processor for executing an operating system, and storage means for storing a file, the operating system being arranged to execute periodically requests to open the file stored in the storage means, wherein the system includes:

means for intercepting at the first computer site a file open request from a second computer site made to the operating system identifying by at least a name a first file to be opened;

means for determining whether the name of the first file should be replaced with the name of a substitute file to be opened and, if it is determined that the name should be so replaced, amending the request, before passing the request to the operating system, to replace the name of the first file therein with the name of the substitute file, and means for passing the request to the operating system to open the first file if it is determined that the name of the first file should not be replaced, or to open the substitute file at the first computer site if it is determined that the name of the first file should be replaced.

12. A computer system according to claim 11 in the form of a computer network comprising a file server and at least one workstation, wherein the file server has means for maintaining a record of the number of copies of the first file in use on the network, and wherein the means for determining whether the name of the first file should be replaced comprises means for checking whether the record indicates that a predetermined number of copies would be exceeded by executing the file open request.

13. A method of limiting the number of copies of a file in use in a computer system, the computer system comprising a memory means, a central processor for executing an operating system, and storage means for storing a file, the method comprising:

intercepting a file open request made to the operating system identifying by at least a name, a first file to be opened;

extracting from the file open request the name of the first file;

comparing the name of the first file with a set of file names to determine whether the first file is a file which is monitored;

checking, if the first file is a file which is monitored, a count of the number of copies of the first file in use to determine if a maximum number of copies of the first file has been reached;

amending, if the maximum number of copies of the first file is already in use, the file open request, before passing the request to the operating system, to replace the name of the first file with the name of a substitute file to provide an amended file open request; and passing the file open request to the operating system to open the first file if it is determined that the name of the first file should not be replaced, or passing the amended file open request to the operating system for execution to open the substitute file if it is determined that the name of the first file should be replaced.

14. In a computer system, apparatus for limiting the number of copies of a file in use, the computer system comprising a memory means, a central processor for executing an operating system, and storage means for storing a file, the apparatus comprising;

means for intercepting a file open request made to the operating system identifying by at least a name a first file to be opened;

means for extracting from the file open request the name of the first file;

means for comparing the name of the first file with a set of file names to determine whether the first file is a file which is monitored;

means for checking, if the first file is a file which is monitored, a count of the number of copies of the first file in use to determine if a maximum number of copies of the first file has been reached;

means for amending, if the maximum number of copies of the first file is already in use, the file open request before passing the request to the operating system, to replace the name of the first file with the name of a substitute file to provide an amended file open request, and means for passing the file open request to the operating system to open the first file if it is determined that the name of the first file should not be replaced or for passing the amended file open request to the operating system to open the substitute file if it is determined that the name of the first file should be replaced.

* * * * *